United States Patent [19]
Magnuson et al.

[11] Patent Number: 5,967,491
[45] Date of Patent: Oct. 19, 1999

[54] ANTI-LEAK QUICK ACTION COUPLER

[75] Inventors: Ruel D. Magnuson, Eagle; Kenneth T. Brady, Lincoln, both of Nebr.

[73] Assignee: Parker-Hannifin Corporation, Cleveland, Ohio

[21] Appl. No.: 09/164,877

[22] Filed: Oct. 1, 1998

Related U.S. Application Data

[60] Provisional application No. 60/067,172, Dec. 1, 1997.

[51] Int. Cl.⁶ .................................................. F16L 29/00
[52] U.S. Cl. .................................... 251/149.6; 137/614.05
[58] Field of Search ............................. 251/149.6, 149.1, 251/149.9; 137/614.05, 614.03

[56] References Cited

U.S. PATENT DOCUMENTS

| | | |
|---|---|---|
| 3,106,378 | 10/1963 | Hellstern . |
| 3,106,379 | 10/1963 | Sciuto et al. . |
| 3,127,149 | 3/1964 | Cruse . |
| 3,236,251 | 2/1966 | Hansen ................................ 137/614.05 |
| 3,378,225 | 4/1968 | Snyder, Jr. . |
| 3,567,175 | 3/1971 | Sciuto, Jr. . |
| 4,086,939 | 5/1978 | Wilcox et al. .................... 251/149.6 X |
| 4,094,567 | 6/1978 | Karcher et al. . |
| 5,445,358 | 8/1995 | Anderson . |
| 5,730,185 | 3/1998 | Wilkins et al. ................. 137/614.05 X |

OTHER PUBLICATIONS

Aeroquip Aerospace Engineering Bulletin AEB/40 copyrighted 1970.
Snap–tite 31 Series Push–To–Connect Couplings.

Primary Examiner—Kevin Lee
Attorney, Agent, or Firm—Christopher H. Hunter

[57] ABSTRACT

A push-to-connect coupler has a cylindrical coupler body with first and second radial flow passages separated by an internal partition, an inner valve assembly, and an outer sleeve assembly. The inner valve assembly includes a valve sleeve which cooperates with a cylindrical extension extending axially downstream from the partition to prevent leakage from the coupler body. When the nipple is inserted into the coupler socket, the nipple moves the valve sleeve axially upstream away from the distal end of the extension to allow fluid to flow between the extension and the valve sleeve to the nipple. The outer sleeve assembly includes a locking sleeve and a cylindrical slide valve surrounding the coupler body. The locking sleeve is spring-biased to urge locking balls into a groove on the nipple and retain the nipple in the coupler socket. The slide valve is slidable to selectively allow fluid to bypass a partition in the coupler body and flow to the nipple. The locking sleeve automatically engages the slide valve at disconnect to prevent accidental disconnect without shutting off flow through the coupler.

7 Claims, 3 Drawing Sheets

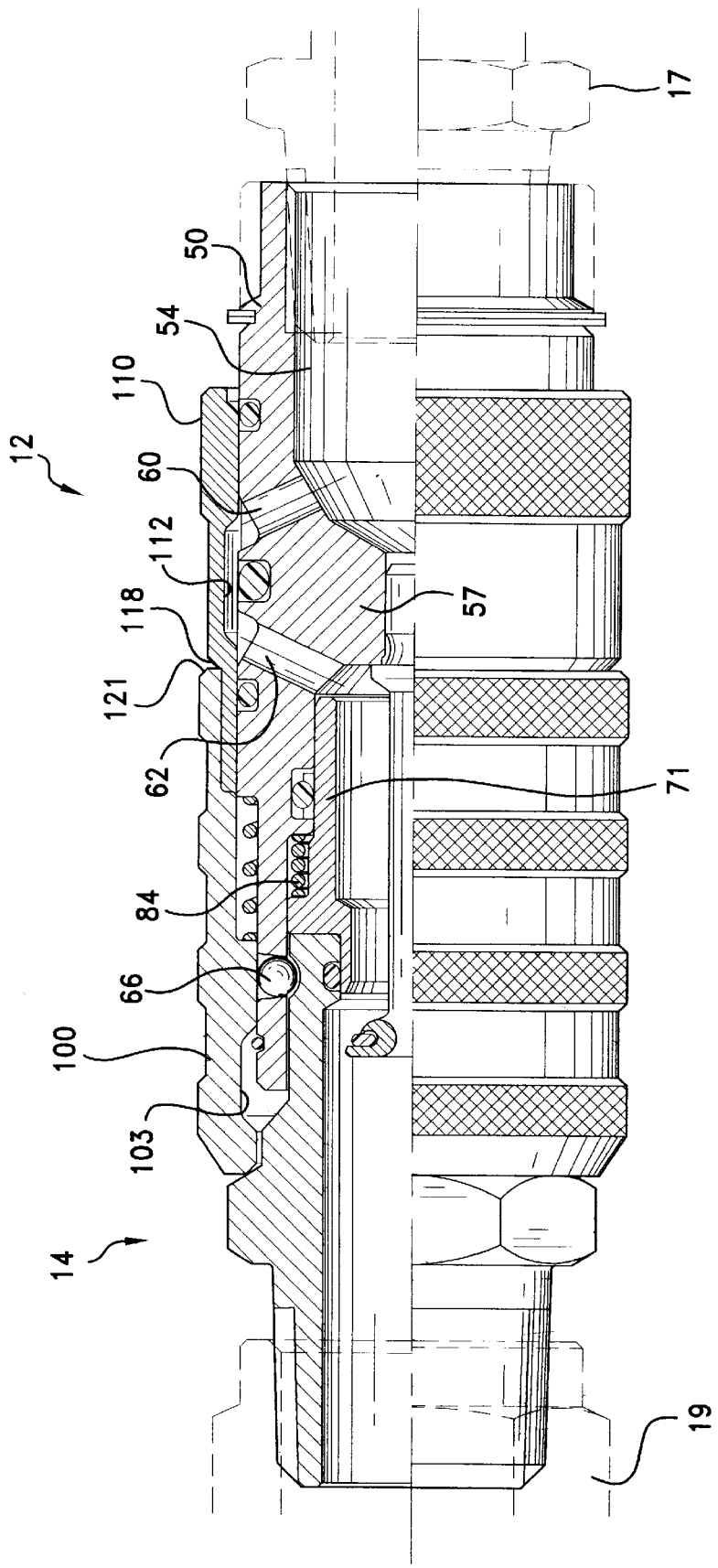

ANTI-LEAK QUICK ACTION COUPLER

RELATED CASES

The present application claims priority to U.S. Provisional Application Ser. No.60/067,172; filed Dec. 1, 1997.

FIELD OF THE INVENTION

The present invention relates to push-to-connect, fluid-tight couplings comprising a female coupler socket and a male nipple.

BACKGROUND OF THE INVENTION

Couplers (or couplings) are well-known devices to interconnect hoses or tubes in a fluid flow system. A coupler typically includes a coupler socket (female element) and a nipple (male element). The coupler socket is attached by a first conduit to a source of fluid, e.g., a pressurized tank, while the nipple is attached by a second conduit to e.g., a tool, machine or dispense head. When the nipple is inserted into the coupler socket, a closure valve mounted within the socket opens to provide a fluid flow path through the coupler. At the same time, a catch or coupling mechanism automatically engages the nipple to retain the nipple within the socket. The coupling mechanism can be manually released to disconnect the nipple from the coupler socket. Such a coupler is typically referred to as a "push-to-connect" coupler.

The nipple for the coupler includes a tubular shank or plug circumscribing a central bore, and a downstream port which enables the nipple to be connected to the conduit. The shank of the nipple narrows down and includes a circumferential groove or channel toward the inlet end. When the nipple is inserted into the socket, the coupling mechanism is received in the groove and engages the shank to retain the nipple within the coupler socket.

A number of different types of coupler sockets have been developed for retaining the nipple within the coupler. One popular type of coupler socket includes a cylindrical body having an internal wall or partition extending perpendicular to the axis of the coupler which fluidly separates the inlet end of the body from the outlet end of the body. A first radial passage is formed axially along the body on one side of the wall, while a second radial passage is formed axially along the body on the other side of the wall. A sleeve surrounds the cylindrical body and includes a cylindrical channel along the inside surface. When the sleeve is in a first position (the closed position), the channel is aligned with only one of the radial passages and fluid is prevented from flowing through the coupler. When the sleeve is moved axially with respect to the coupler into a second position (the open position), the channel is aligned with both of the radial passages, and fluid can bypass the internal wall and flow through the coupler. Movement of the sleeve allows the user to pressurize or depressurize the conduit from the coupler as desired. Movement of the sleeve (or a separate sleeve surrounding the coupler body) also allows the user to disengage the coupling mechanism, such that the nipple can be removed from the coupler socket. The above-described coupler is shown for example, in U.S. Pat. Nos. 3,477,688; 3,106,378 and 3,106,379.

While the above couplers might be appropriate for certain applications, when the sleeve on the coupler is moved to the closed position and the nipple is separated from the coupler socket, a certain amount of fluid can be present in the outlet or downstream side of the coupler which can leak out of the coupler and dirty the user's hands and/or contaminate the surrounding area. Also, certain of the prior couplers, for example the coupler shown in U.S. Pat. No. 3,477,688, only provide for movement of the valve sleeve into a "fully open" or "fully closed" position where there is a maximum or minimum flow, and do not allow for the easy manual movement of the valve sleeve into intermediate positions for the controlled metering of fluid through the coupler (at least without having to actually hold the valve sleeve in the desired position).

As such, it is believed there is a demand in the industry for a push-to-connect type coupler which prevents leakage on the outlet side of the coupler when the nipple is removed from the coupler socket. It as also believed there is a demand for a simple coupler socket which provides quick connect and disconnect and prevents accidental disconnect without shutting off flow through the coupler. It is further believed there is a demand in the industry for a coupler which allows the metering of fluid through the coupler across a range of rates between the "fully open" and "fully closed" positions. It is still further believed that there is a continual demand in the industry for a push-to-connect type coupler which is reliable and which is easy to manufacture, assemble and use.

SUMMARY OF THE INVENTION

The present invention provides a novel and unique push-to-connect type coupler which prevents leakage on the outlet side of the coupler socket when the nipple is removed from the coupler. The coupler socket also provides quick connect and disconnect and prevents accidental disconnect without shutting off flow through the coupler. The coupler also provides for metering the fluid through the coupler at any desired rate between the "fully open" and "fully closed" positions. Further, the coupler socket is reliable and is formed from components which are relatively simple and inexpensive to manufacture, assemble and use.

The coupler socket of the present invention includes a cylindrical coupler body with first and second radial flow passages separated by an internal partition, an inner valve assembly, and an outer sleeve assembly. The inner valve assembly includes a sleeve which cooperates with a cylindrical extension extending axially downstream of the partition to prevent leakage from the coupler body. The valve sleeve is normally spring-biased into sealing engagement with the distal (downstream) end of the extension. When the nipple is inserted into the coupler socket, the nipple moves the valve sleeve axially upstream away from the distal end of the extension to allow fluid to flow between the extension and the valve sleeve to the nipple. When the nipple is removed, the spring-biased valve sleeve moves downstream and again engages the distal end of the extension for a fluid-tight seal. An O-ring seal is also provided at the distal end of the extension to seal with the valve sleeve.

The outer sleeve assembly includes a locking sleeve and a cylindrical slide valve surrounding the coupler body. The locking sleeve includes an inner circumferential groove or channel which is normally aligned with a series of circumferentially-arranged radial through-holes in the cylinder body to outwardly retain a series of locking balls. The locking balls are also inwardly retained in the through-holes by the valve sleeve. When the nipple is inserted into the coupler socket and the sleeve moves upstream, the locking sleeve is spring-biased to drive the locking balls radially inward into engagement with the shank of the nipple to retain the nipple in the coupler socket.

The slide valve for the sleeve assembly also includes an inner circumferential groove or channel which is normally aligned with only one of the radial flow passages in the closed position of the coupler to prevent flow through the coupler. The slide valve can be manually manipulated into an open position to align the channel with both the flow passages to allow flow through the coupler. The slide valve can only be manipulated into the open position after the nipple is secured in the coupler socket. The slide valve can also be selectively positioned in any intermediate position between the "fully open" or "fully closed" position to meter fluid through the coupler.

When the nipple is to be removed, the slide valve is first moved to the closed position and the locking sleeve is moved axially upstream against the spring bias to allow the locking balls to move radially outward into the circumferential channel and release the nipple. If the slide valve is left in the open position during disconnect, the locking sleeve will engage the slide valve and moves the slide valve to the closed position to prevent flow through the coupler.

The present invention as described above thereby provides a coupler which has an inner valve assembly which prevents leakage on the outlet side of the coupler socket when the nipple is removed from the coupler. The coupler socket also has an outer sleeve assembly which provides quick connect and disconnect and prevents accidental disconnect without shutting off flow through the coupler. The slide valve of the outer sleeve assembly can also be moved into any intermediate position between "fully open" and "fully closed" to meter fluid through the coupler. The coupler socket is reliable and is formed from components which are relatively simple and inexpensive to manufacture, assemble and use.

Further features and advantages of the present invention will become apparent upon reviewing the following detailed description and the accompanying drawings.

BRIEF DESCRIPTION OF THE DRAWINGS

FIG. 3 is a view, in section, of the coupler of FIG. 2, with the coupler open.

DETAILED DESCRIPTION OF THE PREFERRED EMBODIMENT

Figure 1:
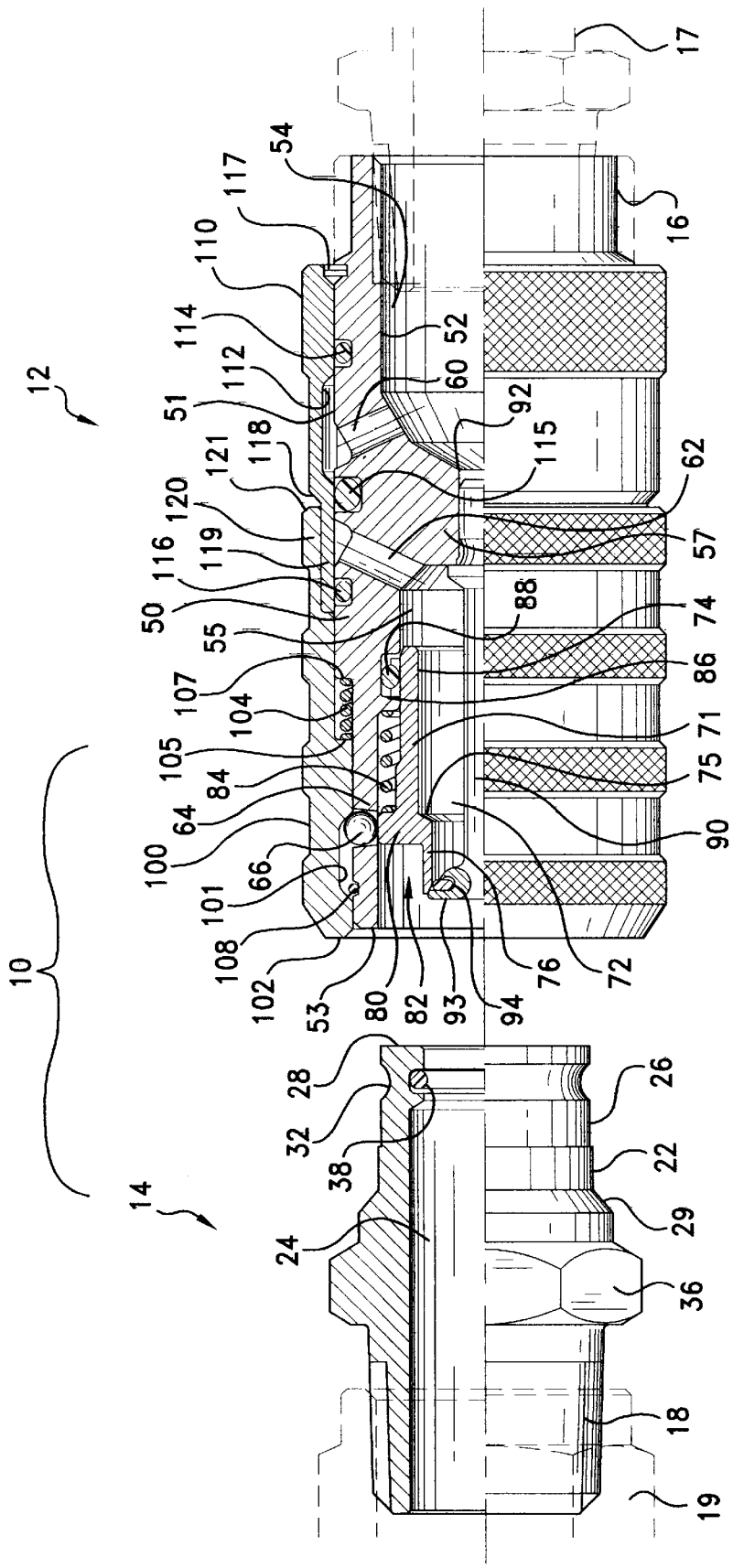
FIG. 1 is a view, in section, of the coupler of the present invention in the fully disengaged position with the coupler socket and nipple separated.

Referring to the drawings, and initially to FIG. 1, a coupler constructed according to the present invention is indicated generally at 10. The coupler includes a coupler socket, indicated generally at 12, and a nipple, indicated generally at 14. The coupler socket and nipple are designed to be incorporated into a fluid system, for example, a pressurized liquid system to operate a machine, tool or dispense head. To this end, the coupler socket 12 includes an upstream port 16 which receives a first fluid conduit 17, e.g., a hose, tube or fitting. The nipple 14 includes a similar downstream port 18, which receives a second fluid conduit 19, e.g., a second hose, tube or fitting. As will be described below, the nipple 14 is designed to be received and retained within the coupler socket 12 to allow fluid to flow from port 16 to port 18 in the fluid system.

The nipple 14 for the coupler is preferably a standard, commercially-available metal nipple having an outer shank or plug 22 which circumscribes a central bore 24. A narrow, tubular portion 26 with a relatively smooth exterior surface extends from the upstream end 28 of the nipple. The tubular portion 26 includes a circumferentially-extending groove or channel 32 proximate the upstream end 28 of the nipple. The tubular portion 26 tapers radially outward at 29 to an enlarged gripping surface 36 which is configured to receive an appropriate tool for threading the nipple onto the fluid conduit 19. An O-ring seal 38 is provided in a circumferential groove formed in the inner surface of bore 24 toward upstream end 28.

The coupler socket 12 for the coupler includes a cylindrical body 50 which circumscribes an inner bore 52 extending between upstream port 16 and a downstream opening 53. The bore 52 includes a first inner cavity 54 located at the upstream end of the body dimensioned to clearly received conduit 17, and a second inner cavity 55 located at the downstream end of the body dimensioned to closely receive nipple 14. The upstream cavity 54 is fluidly separated from downstream cavity 55 by an inner wall or partition 57, which extends substantially perpendicular to the axis of the coupler socket. At least one, and preferably a series of circumferentially-arranged upstream radial flow passages 60 are formed through cylindrical body 50 at a location upstream from partition 57. Similarly, at least one, and preferably a series of circumferentially-arranged downstream radial flow passages 62 are formed through cylindrical body 50 at a location downstream from partition 57.

A plurality of through-bores 64 extend radially inward through body 50 in a circumferential arrangement toward the downstream end 53 of the body. Each bore 64 receives a locking ball 66. Bores 64 are inwardly-tapered to an extent such that locking balls 66 cannot pass inwardly into the downstream cavity 55, but otherwise are freely movable therein.

A cylindrical valve sleeve 71 is slidably received within the downstream cavity 55 of the coupler body 50. Valve sleeve 71 circumscribes a central cavity 72 which extends between downstream passage 62 and downstream opening 53. Sleeve 71 includes a first, upstream portion 74 which tapers radially inward at shoulder 75 to second, downstream portion 76. The downstream portion 76 includes an outwardly-tapered surface 77 (FIG. 2) bounding the downstream opening to the sleeve. The sleeve also includes a radially-outward extending annular flange 80 which is closely received within coupler body 50 and normally is axially located to urge locking balls 66 outwardly from grooves 64. The downstream annular surface of flange 80 and the outer cylindrical surface of downstream portion 76 define an annular nipple cavity, indicated generally at 82.

Sleeve 71 is biased in the downstream direction by a compression spring 84 surrounding upstream portion 74 and disposed between the upstream end surface of flange 80 and a radially-inwardly projecting annular shoulder 86 formed in coupler body 50. A resilient O-ring seal 88 is provided in an inwardly-facing groove in coupler body 50 to provide a fluid tight seal between coupler body 50 and valve sleeve 71.

A cylindrical extension 90 is received within an opening 92 formed in partition 57, and extends axially downstream therefrom through central cavity 72 toward downstream opening 53. Extension 90 can be threaded into opening 92 or affixed therein in any other appropriate manner. Extension 90 flares outwardly at its distal, downstream end 93, and carries a resilient O-ring seal 94. As illustrated in FIG. 1, the flared downstream end 93 of extension 90 has a complimentary geometry to the tapered surface 77 (FIG. 2) of the valve sleeve 71, such that in this position (that is, with spring 84 biasing valve sleeve 71 in the downstream direction as illustrated in FIG. 1), seal 94 engages downstream valve sleeve portion 76 to provide a fluid-tight seal between extension 90 and valve sleeve 71. In addition, the flared end 93 of fixed extension 90 limits the downstream axial movement of sleeve 71 caused by spring 84.

A cylindrical locking sleeve 100 is provided in surrounding, closely-spaced relation to coupler body 50, toward the downstream end of the coupler body. Locking sleeve 100 includes an inner, circumferentially-extending groove or channel 101, which is formed near downstream end 102. Locking sleeve 100 is normally axially disposed relative to coupler body 50 such that locking balls 66 are outwardly received in groove 101. A compression spring 104 is provided between a radially-inwardly projecting annular shoulder 105 on the locking sleeve and a radially-outwardly projecting annular shoulder 107 on the coupler body 50 to bias locking sleeve 100 in the downstream direction. Locking sleeve 100 is retained on coupler body 50 at its downstream end by a retaining ring 108 received in a circumferential groove formed in coupler body 50. When locking balls 66 are urged outwardly by flange 80 on slide valve 71 into groove 101, locking balls 66 prevent further downstream movement of the locking sleeve beyond that illustrated in FIG. 1.

A cylindrical slide valve 110 is also provided in surrounding, closely-spaced relation to coupler body 50, toward the upstream end of the coupler body. Slide valve 110 also includes an inner, circumferentially-extending groove or channel 112, which is formed at about the midpoint thereof. Channel 112 is normally aligned with only the first radial passage 60 in coupler body 50. First and second O-ring seals 114, 115 are provided in grooves in the outer surface of coupler body 50 on either side of passage 60 to prevent fluid leakage to second passage 62 as well as externally of the coupler socket. An additional O-ring seal 116 is also provided in a groove in the outer surface of coupler body 50 on the downstream side of second passage 62 to prevent fluid leakage externally from the coupler socket. When slide valve 110 is in the position illustrated in FIG. 1, fluid is prevented from bypassing partition 57 and flowing from first conduit 17 through coupler socket 12 to nipple 14.

Slide valve 110 tapers inwardly at annular shoulder 118 to a narrow downstream cylindrical portion 119. The downstream portion 119 is slidably received in an enlarged, outwardly-stepped upstream cylindrical portion 120 of the locking sleeve 100. The upstream end 121 of locking sleeve 100 can engage the tapered shoulder 118 of slide valve 110 to move the slide valve 110 axially upstream, and thereby align channel 112 with both first and second radial passages 60, 62, as will be described herein in more detail. Slide valve 110 is retained on coupler body 50 at its upstream end by a retaining ring 117 received in a circumferential groove formed in coupler body 50.

Figure 2:
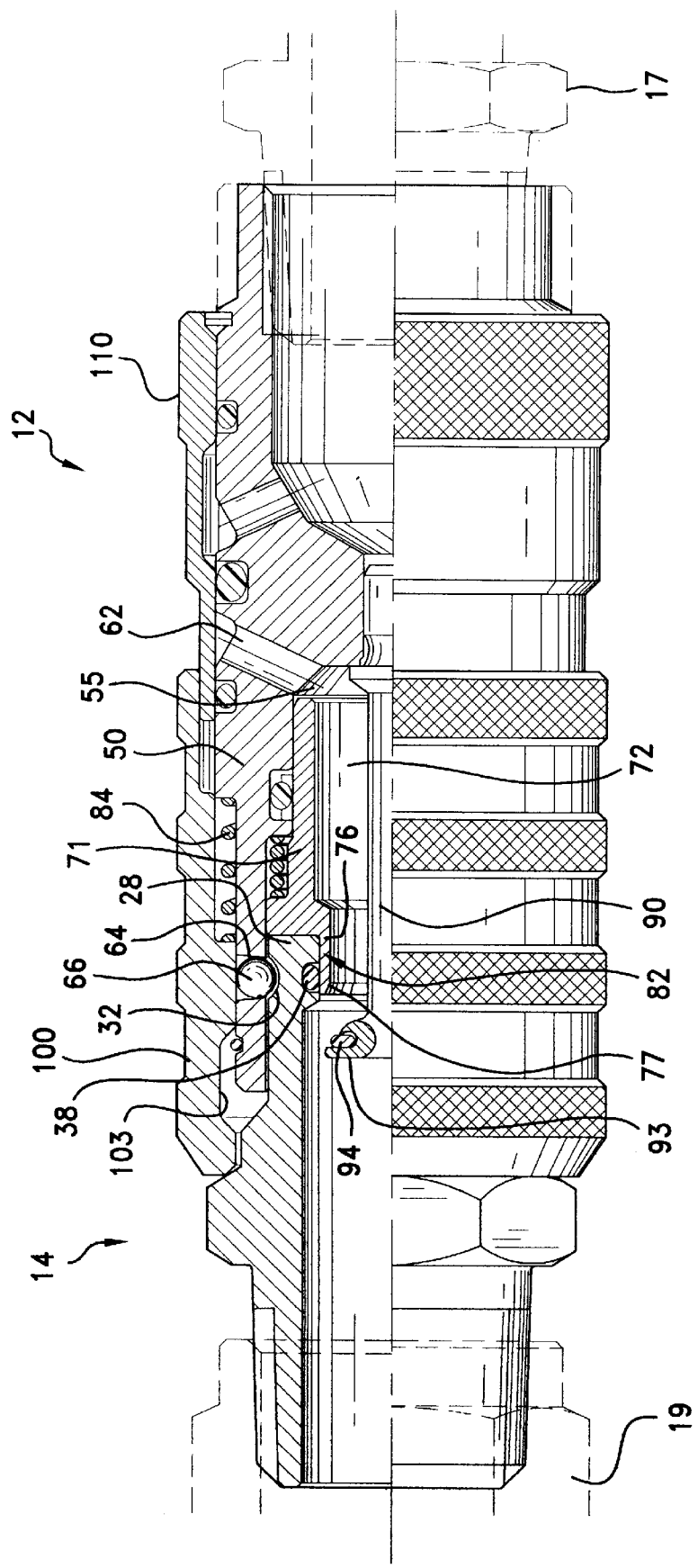
FIG. 2 is a view, in section, of the coupler of FIG. 1, showing the nipple inserted into the coupler of FIG. 1 with the nipple in an initial locked position and the coupler closed.

The connecting and disconnecting of nipple 14 to coupler socket 12 will now be briefly explained. Referring now to FIG. 2 which shows the coupler socket in a closed condition, the nipple 14 can be inserted axially into the coupler socket 12 such that the upstream nipple end 28 is received in nipple cavity 82. O-ring seal 38 in nipple 14 provides a fluid seal with the outer surface of the upstream portion 76 of valve sleeve 71. Upon pushing nipple 14 into the coupler 12, valve sleeve 71 is moved upstream until groove 32 in nipple 14 becomes aligned with locking balls 66, at which point locking balls 66 are urged by the spring-biased locking sleeve 100 radially inward into groove 32. The cooperation between the inside surface of sleeve 100, groove 64 in coupler body 50, and groove 32 in the nipple 14, retains the nipple 14 in the coupler socket 12.

During insertion of the nipple 14 into coupler 12, the nipple engages valve sleeve 71 and urges valve sleeve 71 upstream within coupler body 50. As illustrated, the upstream movement of valve sleeve 71 moves end surface 77 of downstream portion 76 upstream out of engagement with the distal end 93 of extension 90. At this point, a flow path is provided from second radial passage 62, through downstream cavity 55 defined in coupler body 50, through cavity 72 defined in valve sleeve 71 and between extension 90 and sleeve 71 to nipple 14. It is noted that slide valve 110, being in the closed position,6 prevents fluid flow through the coupler from conduit 17 of coupler socket 12 to conduit 19 of nipple 14. Seal 114 in particular, acting between coupler body 50 and slide valve 110, fluidly separates first passage 60 from second passage 62.

Referring now to FIG. 3, when it is desired to pressurize the fluid system, the slide valve 110 is moved axially upstream such that the coupler is in an open condition. Fluid can thereby pass from conduit 17, through upstream cavity 54 defined in coupler body 50, through first radial passage 60, bypass partition 57 by passing through channel 112 formed in slide valve 110 and to second radial passage 62. Fluid then flows from second passage 62 through the flow path described above to conduit 19 of nipple 14. It is noted that slide valve 110 cannot be moved into an open position (that is, moved upstream) until a nipple is inserted into the coupler socket and the coupler has secured the nipple by locking sleeve 110 moving downstream out of blocking relation of slide valve 110.

It is also noted that slide valve 110 can be manually manipulated into any intermediate position between the fully closed position (FIG. 1) and the fully open position (FIG. 3). The orientation of groove 112 in slide valve 110 with radial passages 60, 62 in valve body 50 determines the metering of fluid through the coupler. The friction between slide valve 110 and valve body 50, as well as seals 114–116 keeps slide valve 110 in the desired position.

To disconnect nipple 14 from coupler socket 12, the above steps are reversed, that is the slide valve 110 is initially moved axially upstream to close off fluid flow through passage 60 to passage 62 (as in FIG. 2). The locking sleeve 100 is then moved axially upstream until locking balls 66 are urged radially outward into channel 103 by the bias of spring 84 on valve sleeve 71 (as in FIG. 1). If the user neglects to first move slide valve 110 into a closed position and instead begins by moving locking sleeve 100, the upstream end 121 of locking sleeve 100 will automatically engage the tapered portion 118 of slide valve 110, and move the slide valve upstream to close off the flow path. In this way, pressure is blocked before the nipple becomes free, which prevents blow-out of the nipple and unintended release of fluid. Finally, as the nipple 14 is retracted from the coupler socket 12, seal 94 on the distal end 93 of extension 90 again engages and seals against valve sleeve 71 to prevent leakage of any remaining fluid in downstream cavity 55.

To service the coupler socket 12, retaining ring 117 (FIG. 1) can be removed to allow removal of the slide valve 110 from the coupler body 50 for access to O-rings 114, 115 and 116 for inspection and replacement if necessary. Likewise, extension 90 can be unscrewed or otherwise removed from partition 57, to allow removal of valve sleeve 71 and spring 84 and access to O-ring 88 for inspection and replacement if necessary. Once valve sleeve 71 is removed, locking balls 66 drop radially inward, and when retaining ring 108 is removed, the locking sleeve 100 and spring 104 can then be removed. Assembly of the coupler socket 12 is accomplished by reversing the above steps.

Thus, as described above, the present invention provides a novel and unique push-to-connect type coupler which has an inner valve assembly which prevents leakage on the outlet side of the coupler socket when the nipple is removed from the coupler. The coupler socket also has an outer sleeve assembly which provides quick connect and disconnect and prevents accidental disconnect without shutting off flow through the coupler. The slide valve of the outer sleeve assembly can also be moved into any intermediate position between "fully open" and "fully closed" to meter fluid through the coupler. The coupler socket is also reliable and is formed from components which are relatively simple and inexpensive to manufacture, assemble and use.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

What is claimed is:

1. A coupler for receiving a nipple, said coupler comprising a cylindrical body with a first end for receiving a conduit and a second end for receiving a nipple, a partition fluidly separating the first end from the second end and defining first and second cavities, a first radial passage through the body at a first axial location into the first cavity and a second radial passage through the body at a second axial location into the second cavity, a series of locking balls disposed in circumferentially-arranged radial holes in the body toward the second end for engaging and retaining the nipple, a locking sleeve surrounding said coupler body, said locking sleeve including a channel extending circumferentially around an inside surface of said sleeve for receiving the locking balls, said sleeve being axially moveable between a first position where said locking balls are allowed to move radially outward into the channel, and a second position where said locking balls are urged radially inward by said sleeve and can engage the nipple, a spring disposed between a shoulder projecting radially outwardly from the coupler body and a shoulder projecting radially inwardly from the sleeve for normally biasing said sleeve into the first position and for allowing the sleeve to be manually manipulated into said second position, a cylindrical slide valve also surrounding said cylindrical body of said coupler, said slide valve including a channel extending circumferentially around an inside surface of the valve, the valve being axially moveable between a first position where said channel is radially aligned with only the first radial passage and not the second passage to prevent fluid flow through the coupler, and a second position where said channel is radially aligned with both the first and second radial passages to allow fluid flow through the coupler, said slide valve, when in said second position, being engaged by the sleeve when the sleeve is manually manipulated from the second position to the first position to also move said slide valve into the first position.

2. The coupler as in claim 1, wherein said sleeve includes an outwardly-stepped portion at a first end of the sleeve, and said slide valve includes a narrow portion received within said outwardly-stepped portion of said sleeve and a shoulder formed on the outside surface of the slide valve at a first end of the slide valve, said sleeve engaging said outside shoulder of said slide valve to move said slide valve into the first position when said sleeve is manually manipulated from said second position to said first position.

3. The coupler as in claim 1, wherein the slide valve can also be disposed in any intermediate position between the first position and the second position to meter fluid through the coupler.

4. A coupler for receiving a nipple, said coupler comprising a cylindrical body with a first end for receiving a conduit and a second end for receiving a nipple, a partition fluidly separating the first end from the second end and defining first and second cavities, a first radial passage through the body at a first axial location into the first cavity and a second radial passage through the body at a second axial location into the second cavity, a series of locking balls disposed in circumferentially-arranged radial holes in the body toward the second end for engaging and retaining the nipple, a cylindrical slide valve also surrounding said cylindrical body of said coupler, said slide valve including a channel extending circumferentially around an inside surface of said valve, said valve being axially moveable between a first position where said channel is radially aligned with only the first radial passage and not the second radial passage to prevent fluid flow through the coupler, and a second position where said channel is radially aligned with both said first and second radial passages to allow fluid flow through the coupler, a valve sleeve received in said cylindrical body of said coupler and moveable between a first position into engagement with said locking balls for forcing said locking balls radially outward into the groove in the locking sleeve and a second position out of engagement with said locking balls for allowing said locking balls to move radially inward into engagement with the nipple, said valve sleeve having a forward end engageable by the nipple to move the valve sleeve from the first position to the second position, a cylindrical extension extending axially from said partition toward said second end, said extension and said valve sleeve being in engaging sealing relation when said valve sleeve is in said first position and preventing fluid flow out of the coupler, and being in axially spaced relation when said valve sleeve is in said second position to allow fluid flow out of the coupler.

5. The coupler as in claim 4, wherein said extension includes a resilient seal bounding a distal end, said seal being in engaging relation with said valve sleeve when said valve sleeve is in said first position.

6. The coupler as in claim 4, wherein said valve sleeve includes an annular recess formed in the forward end for receiving the nipple.

7. The coupler as in claim 4, further including a spring normally biasing said valve sleeve into said first position, said sleeve extending between a shoulder formed on the inside surface of the cylindrical body of the coupler and a shoulder formed on the outside surface of the valve sleeve.

* * * * *